United States Patent [19]

Bartosiak et al.

[11] Patent Number: 5,085,525
[45] Date of Patent: Feb. 4, 1992

[54] SCANNING INFRARED TEMPERATURE SENSOR WITH SIGHTING APPARATUS

[75] Inventors: George Bartosiak, Naperville; Sam Paris, Chicago; Jeffrey M. Kresch, Gurnee; William J. Danley, Highland Park; Eugene F. Kalley, St. Charles; Arthur E. Goldberg, Evanston, all of Ill.

[73] Assignee: Square D Company, Palatine, Ill.

[21] Appl. No.: 601,479

[22] Filed: Oct. 19, 1990

[51] Int. Cl.⁵ .................................................. G01J 5/08
[52] U.S. Cl. .................................. 374/124; 374/130; 250/334
[58] Field of Search ............... 374/124, 127, 130, 128, 374/5; 250/338.1, 330, 342, 334; 358/82, 113; 340/584, 600; 356/43, 45, 48

[56] References Cited

U.S. PATENT DOCUMENTS

| | | | |
|---|---|---|---|
| 4,087,689 | 5/1978 | Asawa | 250/342 |
| 4,315,150 | 2/1982 | Darringer et al. | 374/130 X |
| 4,524,386 | 6/1985 | Scott | 358/113 |
| 4,566,808 | 1/1986 | Pompei et al. | 374/124 |
| 4,634,290 | 1/1987 | Rosencwaig et al. | 374/5 |
| 4,634,294 | 1/1987 | Christol et al. | 374/130 X |
| 4,687,344 | 8/1987 | Lillquist | 374/124 |
| 4,746,224 | 5/1988 | Mizuno et al. | 374/124 |
| 4,840,496 | 6/1989 | Elleman et al. | 374/130 X |

FOREIGN PATENT DOCUMENTS 184938  11/1982  Japan ................... 374/130

Primary Examiner—Allan N. Shoap
Assistant Examiner—G. Bradley Bennett
Attorney, Agent, or Firm—Michael J. Femal; James W. Potthast

[57] ABSTRACT

A solid state laser visible light source (26) passes light through a scanning mechanism (22) otherwise used to convey radiation from a target (12) to a detector (28) of a scanning radiation sensor (10) to mark with light a line (16) which is continuous when the sensor (10) is operating in a continuous mode, but when the sensor is operated in a spot mode in which a plurality of spots along a scan line are to be individually measured, a control (30) causes the light source to turn on and off at the correct times in the scan cycle to cause the light source (26) to mark the plural spots on the scan line (16). A CCD camera (40) with an automatic gain control circuit (46) is used in conjunction with a band pass light filter (36) to substantially enhance viewability of the image of the light markings (16) on the target (12) on a display (44).

43 Claims, 2 Drawing Sheets

SCANNING INFRARED TEMPERATURE SENSOR WITH SIGHTING APPARATUS

This invention relates generally to a scanning radiation sensor and method for remotely sensing radiation from a target and, more particularly, to such a radiation sensor with a sighting, or aiming, mechanism for marking the target with light at locations to be sensed.

Scanning radiation sensors are well known which have a scanning radiation sensing element assembly for scanning a target to concurrently sense radiation from a plurality of points on the target. In such sensors it is important to determine the precise location on the target from which radiation is being sensed. It is known in spot sensors to aim the sensor at the target by means of a sighting, or aiming, apparatus which projects a light, such as a laser light, to mark the spot on the target which will be sensed for radiation. Various means are used to ensure that the light mark on the target coincides with the precise locations which will be sensed.

An example of such a sighting apparatus is shown in U.S. Pat. No. 4,315,150 issued Feb. 9, 1982 to Darringer et al. In nonscanning, or spot, radiation sensors, a single spot on the target is marked with a light beam directed to the spot to be sensed. In scanning radiation sensors which scan radiation across a line on the target, a line of light across the target is used to mark the target.

Sensing the light mark on a target is a more difficult problem when the light is dispersed across the target and thus is reduced in intensity.

Another problem with such sighting apparatus is that because of poor imaging they are forced to use high intensity, nonsolid state lasers, such as HeNe lasers which are relatively fragile and require high voltage supplies.

Further, no apparatus are available for marking multiple spots on a target for individual concurrent measurement.

SUMMARY OF THE INVENTION

It is therefore a principal object of the present invention to provide a scanning radiation sensor with a sighting apparatus for locating a target whose radiation is to be sensed which marks the target with light in the visible spectrum to be both viewable by eye on the target and also easily viewable through means of a television camera and monitor. Both multiple spots and continuous lines can be marked.

Generally, this object is achieved by first selecting the light source in the visible spectrum which has a minimum wavelength significantly greater than the peak radiation response of human eye perception, of viewable light but still within the visible spectrum, so it is directly observable on the target. In addition, a camera is used having a relative response to light with wavelengths approximately equal to that of the minimum wavelength of the light source which is significantly greater than that of the relative response of human eye perception and which is significantly less responsive to wavelengths of light less than that of peak human eye response to enhance, or relatively brighten, the display of the marking line on said display. Viewability of the marking light on the display is also enhanced by viewing through a light filter which attenuates wavelengths of light significantly less than that of the minimum wavelength of the light source.

Specifically, it is an object of the present invention to provide a sighting apparatus for locating a target whose temperature is to be sensed in a scanning radiation sensor assembly having a scanning radiation sensing element comprising a source of visible light having a preselected minimum wavelength significantly greater than the wavelength of peak relative response of human eye perception of visible light, means for scanning a beam of light from said light source to produce a marking line of light on the target to be sensed by said sensing element assembly and means for enhancing viewability of the marking line including a sighting camera with a display screen for viewing the target and marking line thereon; the camera has a relative response to light with wavelengths approximately equal to the minimum wavelength of the light source which is significantly greater than that of the relative response of human eye perception to brighten display of the marking line on said screen.

A related objective is to provide a sighting apparatus for locating a target whose temperature is to be sensed in a scanning radiation sensor with a scanning radiation sensing element assembly comprising a source of light having a preselected minimum wavelength within the visible light spectrum, means for scanning a beam of light from said light source to mark said target and means for enhancing viewability of the marking line including a light filter; the light filter attenuates wavelengths of light significantly less than that of the minimum wavelength of the light source to enhance visibility of the light source reflected off the target relative to other visible light from the target.

A further object is to provide a scanning radiation sensor having a scanning sensing element assembly for detecting radiation along a line segment with a sighting apparatus for locating the line segment on a target to be sensed, comprising a solid state source of laser light in the visible spectrum, and means for scanning the laser light along a marking line segment on the target which coincides with a line segment along which temperatures will be sensed.

Still another objective of the invention is to provide in a scanning radiation sensor having a scanning sensing element assembly for detecting the individual temperatures of selected spot targets located along a scanning line with a method for locating the spot targets comprising the steps of directing a beam of light in the visible spectrum controlling the beam of light to produce light marking spots coinciding with the selected spot targets along said scan line to be sensed.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
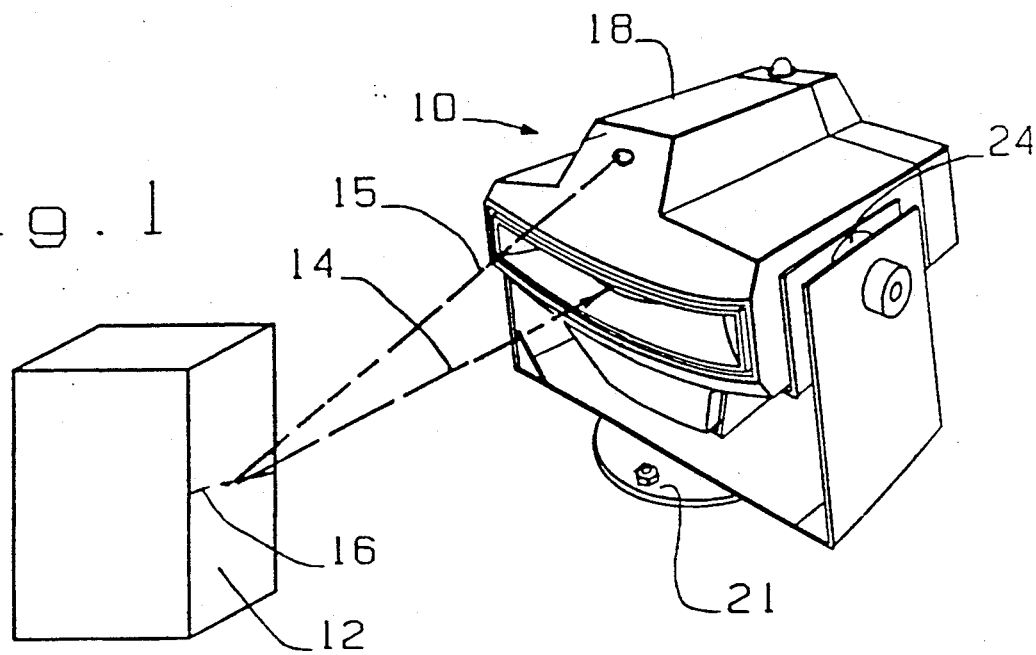
FIG. 1 is a perspective view of the preferred embodiment of the radiation sensor of the present invention being used to mark a target with light markings.

Referring to FIG. 1, the preferred embodiment of the scanning radiation sensor 10 of the present invention is illustrated marking an exemplary target 12, such as a section of steel, plastic or glass or a substitute target, with a beam 14 of visible light along a line 16 on the target.

In the spot mode of operation, the marking line 16 comprises a series of spots, or relatively short line segments from which radiation and corresponding temperature will be individually determined. In a continuous mode of operation, the marking line 16 is substantially continuous over its length along which the temperature or radiation profile will be determined. The light from beam 14 which is reflected off of the target 12 at line 16 returns to the radiation sensor 10 along the optical path 15 and is detected by a camera (not shown) within a housing 18 of the sensor 10. The camera converts the light to an image viewable on a display, or television monitor (not shown).

During aiming of the sensor 10, the housing 18 is physically moved on a vertical swivel assembly connected to a base 21 and mounted on a horizontal swivel assembly 24 to move the marking line 16 until it is positioned on the target 12 at the precise location or, locations, on the target from which it is desired to sense the radiation. Sometimes, the target 12 is several feet from the sensor 10 which, in combination with problems due to ambient visible light and the scanning beam having reduced intensity radiation from the target 12, can cause the marking line to be difficult to view from the remote position of the sensor 10. This problem is solved in accordance with the present invention as explained in greater detail below.

Figure 2:
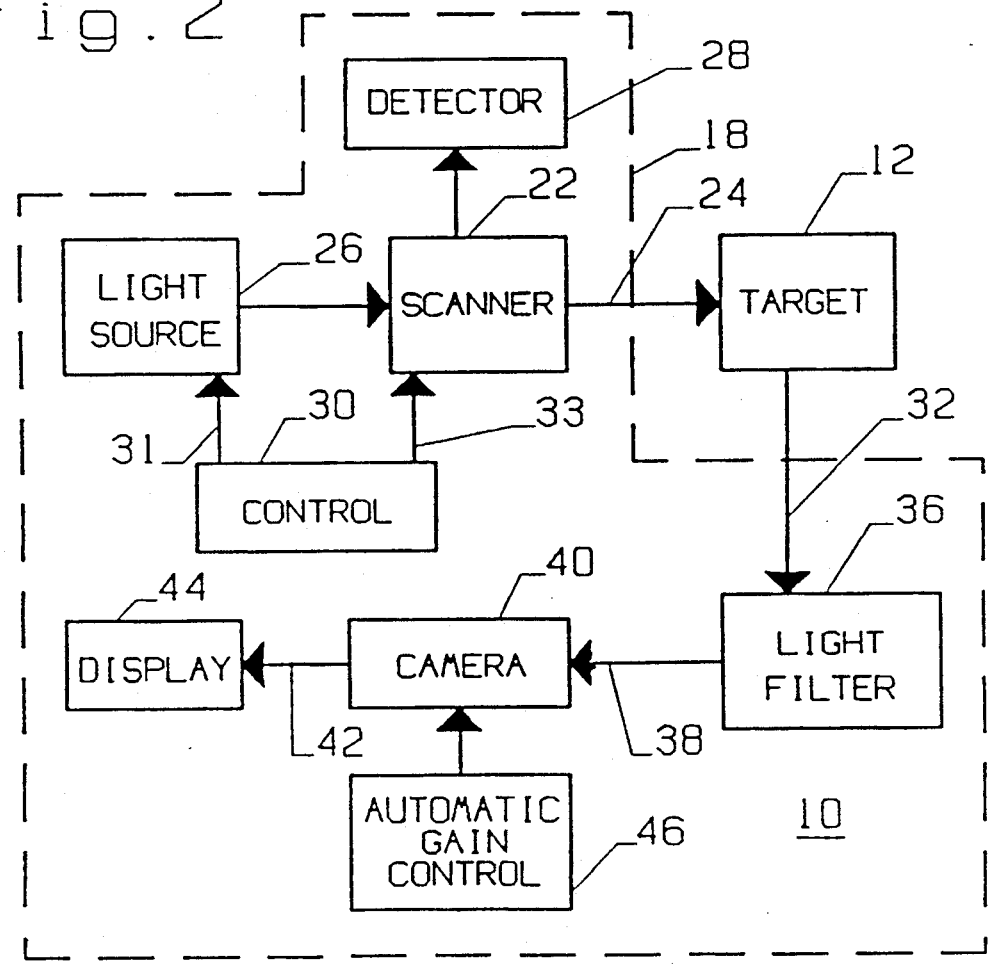
FIG. 2 is a block diagram of the parts of the radiation sensor of FIG. 1 which relate to the present invention.

Referring now to FIG. 2, contained within housing 18 is a scanner 22, including a scanning reflective member, such as a rotating, scanning mirror for obtaining radiation from selected locations on target 12 along the same sensing line 14 through which light from a light source 26 is directed to the target 12 by the scanner 22. The radiation from target 12 is passed to a detector 28 which converts the radiation to a representation of temperature. The scanner 22 and the light source 26 are operated by a control 30 which will be described in further detail below with reference to FIG. 3. However, the details of the structure and relative locations and general operation of the scanner 22, light source 26 and control 30 reference should be made to U.S. patent serial number 07/600638 of Sam Paris entitled "Scanning Radiation Sensor With Movable Baffle Assembly and Method of Sensing", filed on Oct. 19, 1990, contemporaneously herewith, and which has been assigned to the assignee of this application.

Still referring to FIG. 2, one aspect of the invention is achieved by virtue of light striking the target 12 along path 14 being reflected along a path 15, to a light filter 36. The light filter then passes, along a path 38, a preselected portion of the light at 32 to a television camera 40. The camera 40 then converts the light to electrical signals at an output 42 which are coupled to a display, or television monitor, 44. The camera 40 has a gain control circuit, preferably an automatic gain control circuit, 46.

Figure 3:
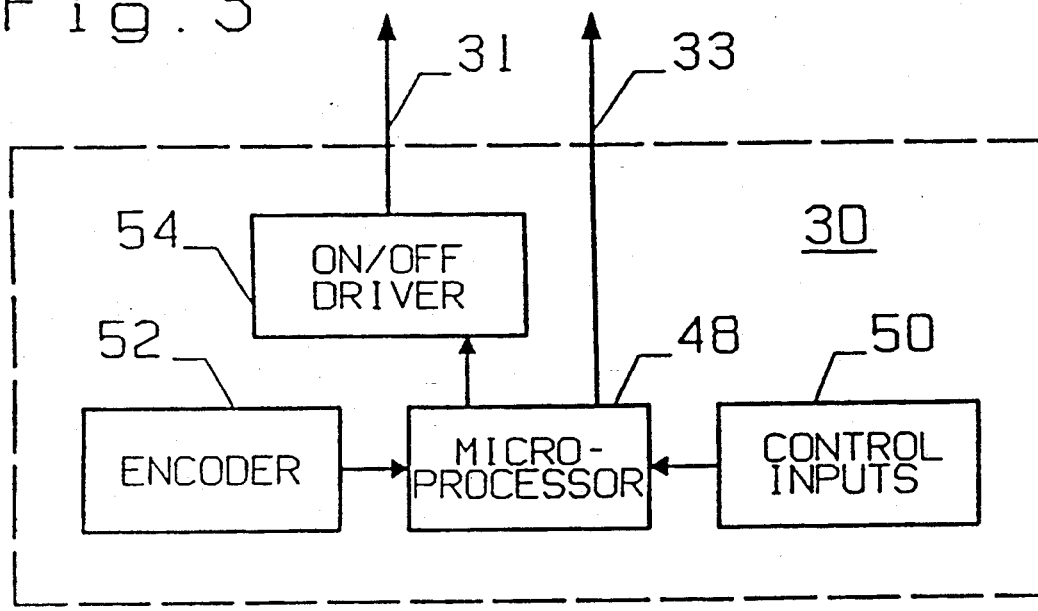
FIG. 3 is a block diagram of the control circuit block of FIG. 2.

Referring now to FIG. 3, the control circuit 30 includes a microprocessor 48 which responds to either manual or automatic control inputs 50 and inputs from a rotary encoder 52 to control an on/off driver circuit 54 and to provide control inputs for the scanning mirror 22 on scanner controller output 33. The rotary encoder provides an index pulse or pulses to synchronize the microprocessor 48 with the position of the scanning mirror 22 within the sensor housing 18 to provide an indication of the precise direction in which the sensor is "looking" for infrared radiation or directed for marking the target 12.

One objective of the invention is achieved by means of an on/off driver circuit 54 which selectively applies power to and removes power from the light source 26, so that a plurality of spots, or relatively short line segments, are marked on the target 12 at which individual temperatures are to be determined immediately after sighting has been accomplished. Because the measuring speed of the scanner is 80 KHz, the on/off cycles of the light source 26 must be at least half this fast. This is achieved in accordance with the present invention through use of a solid state laser.

Figure 4:
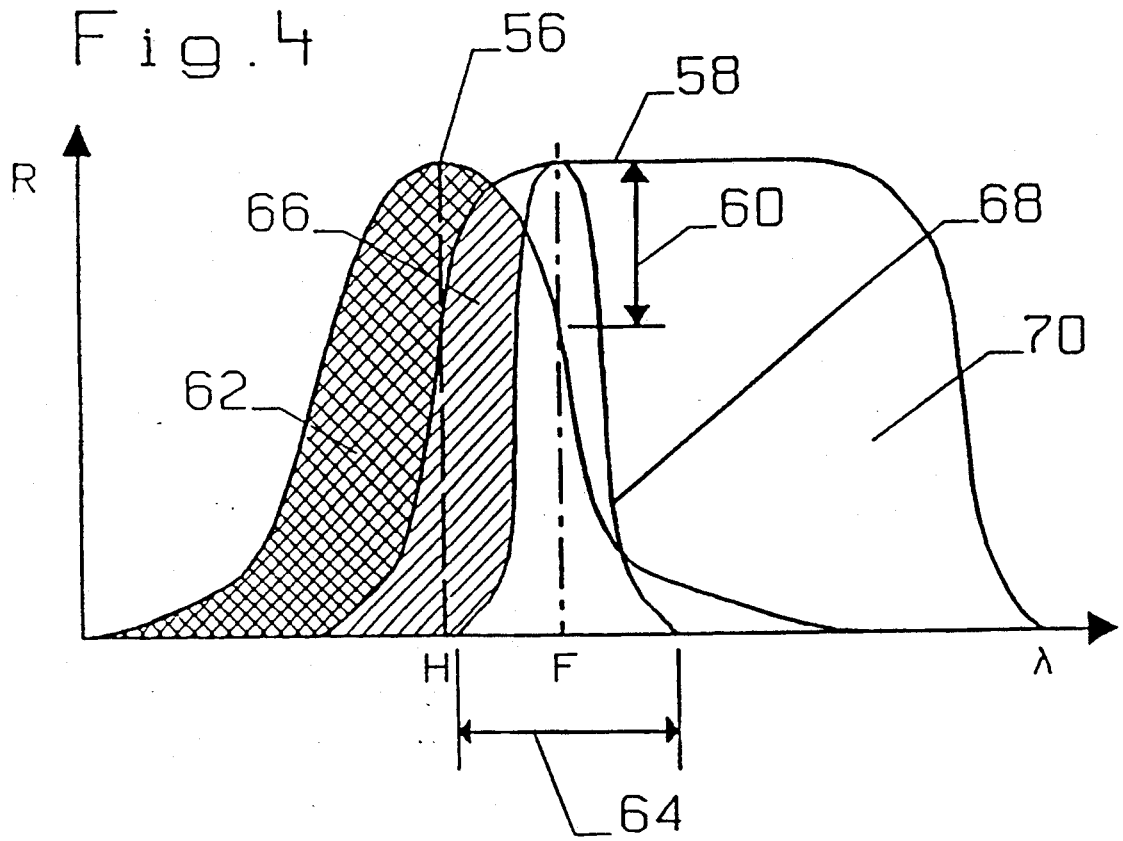
FIG. 4 is a graph of relative responsiveness of the camera and light filter of FIG. 2 to the responsiveness of the human eye to light of varying wavelengths.

Referring to FIG. 4, preferably, the solid state diode laser has a wavelength F in the range of approximately six hundred thirty to six hundred eighty nanometers which is significantly greater than the wavelength H of peak human eye response. The camera 40 is preferably a charge coupled device (CCD) and the response of the camera 40 has a relative response 58 to light with wavelengths F approximately equal to that of the light source 26 which is substantially greater than that of the relative response of human eye perception, as illustrated by the differential response 60.

In addition, it preferably, although not necessarily, has a response which is substantially less than that of human eye perception for a significant portion of the spectrum having wavelengths less than wavelength H of peak human response, as shown by the cross hatched area 62 under the response curve. Also, the camera 40 has a substantially uniform response to light for wavelengths from approximately four hundred nanometers to longer wavelengths beyond the wavelength F of the light source and the viewable light spectrum. Accordingly, a significant portion of light in the visual spectrum which has wavelengths significantly less than the minimum wavelength F are relatively attenuated on the display. Thus, the image of the reflected light from the light source 26 is relatively enhanced on the display.

Achieving another objective of the invention, the light filter 36 attenuates wavelengths of light significantly less from wavelength F of the light source 26 to enhance visibility of the reflected light from the light source 26 relative to other visible light from the target. Preferably, the light filter only passes light having a narrow band 64 of light on either side of wavelength F. This results in relative attenuation of light having wavelengths more as well as less than that of the wavelength F, as shown by diagonally lined area 66.

Preferably, in order to obtain optimum enhancement, the light filter 36 is used in combination with the camera 40 and is interposed between the target and the camera 26 to filter out the light to the camera 40 of wavelengths less than that of the wavelength F. As seen by dotted filter response 68, the wavelengths of light significantly greater than the wavelength F are also substantially attenuated, as shown by clear area 70 under curve 58.

Another advantageous feature of the invention is that the automatic gain control circuit 46 automatically responds to the reduction in light energy caused by light filter 36 by increasing gain, which further enhances viewability of the marking line 16. Alternatively, a manual gain control is employed.

While a detailed description of the preferred embodiment of the invention has been given, it should be appreciated that many variations can be made thereto without departing from the scope of the invention as set forth in the appended claims. For instance, while a CCD type camera display is recommended, other types of cameras with suitable responsiveness could also be used to advantage. Likewise, although a diode laser is recommended, other visible light sources could be employed. Also, the camera and display need not be mounted to the housing 18. In addition, the rotary encoder 52 could be substituted with an index position detector which detects the mirror position once for each rotation of the scanner 22 to send a pulse to the microprocessor 48 from which the position of the scanner 22 can be determined based on the speed of rotation. While in the preferred embodiment, infrared radiation is sensed to determine temperature, the advantages of the invention can be obtained with radiation sensors used for other purposes.

We claim:

1. In a scanning radiation sensor having a scanning radiation sensing element assembly, the improvement being a sighting apparatus for locating a target whose temperature is to be sensed, comprising:
   a source of light having a preselected minimum wavelength significantly greater than the wavelength of peak relative response of human eye perception of visible light;
   means for scanning a beam of light from said light source to produce a marking line of light on the target to coincide with where temperatures are to be sensed by said sensing element assembly; and
   means for enhancing viewability of the marking line including a sighting camera with a display screen for viewing the target and marking line thereon and having a relative response to light with wavelengths approximately equal to that of the laser light source which is significantly greater than that of the relative response of human eye perception to brighten display of the marking line on said screen.

2. The scanning radiation sensor of claim 1 in which said source of light has a wavelength in the range of approximately 630 to 680 nanometers.

3. The scanning radiation sensor of claim 1 in which the relative response of the camera has a substantially uniform relative response to light for wavelengths from approximately 400 nm to longer wavelengths beyond the wavelength of the light source and the visible light spectrum.

4. The scanning radiation sensor of claim 1 in which said source of light includes a solid state laser.

5. The scanning radiation sensor of claim 1 including means for alternately turning on and off said light source to produce marking spots of light along said marking line.

6. The scanning radiation sensor of claim 1 including means for determining the temperature of selected spot targets along said marking line, and
   means for controlling said on and off timing means to cause said marking spots to substantially coincide with the selected spot targets.

7. The scanning radiation sensor of claim 1 in which said source of light is operated substantially continuously to produce the marking line of light as a continuous line.

8. The scanning radiation sensor of claim 1 in which the viewability enhancing means includes a light filter for substantially attenuating wavelengths of light to the camera which are significantly less than that of the light to further enhance visibility on the display of the marking line of light relative to other light from the target.

9. The scanning radiation sensor of claim 8 in which said light filter substantially attenuates wavelengths of light to the camera which are significantly greater than that of the light source to additionally enhance visibility on the display of the marking line of light relative to other light from the target.

10. The scanning radiation sensor of claim 8 in which said scanner has a gain control circuit for increasing the gain to compensate for light attenuation by said light filter for relative brightening the display of the marking line.

11. The scanning radiation sensor of claim 10 in which said gain control circuit automatically increases the gain of the camera in response to attenuation of light by said light filter to brighten the display of the marking line on the screen.

12. The scanning radiation sensor of claim 1 in which said source light is a laser.

13. The scanning radiation sensor of claim 12 in which said laser is a solid state laser.

14. In a scanning radiation sensor with a scanning radiation sensing element assembly, the improvement being a sighting apparatus for determining locations where temperatures are to be sensed, comprising:
   a source of light having a preselected minimum wavelength within the visible light spectrum;
   means for directing a beam of light from said light source to mark said target;
   means for enhancing viewability of the marking line including a light filter for attenuating wavelengths of light significantly less than that of the light source to enhance visibility of the reflected light from the light source relative to other visible light from the target.

15. The scanning radiation sensor of claim 14 in which said source of light is operated substantially continuously to produce a continuous line on said target along which the radiation sensing element assembly is directed to sense the temperature of the target.

16. The scanning radiation sensor of claim 14 in which said source of light is operating intermittently to selectively produce a plurality of light spots along said marking line at which said scanning radiation sensing element assembly senses discrete spot temperatures.

17. The scanning radiation sensor of claim 16 in which said source of light includes a solid state laser.

18. The scanning radiation sensor of claim 14 in which said source of light includes a laser for producing laser light having a characteristic wavelength approximately in the range of 630 to 680 nanometers.

19. The scanning radiation sensor of claim 14 in which said light filter attenuates wavelengths of the light which are significantly shorter than that of the light source to enhance visibility of the reflected laser light relative to other visible light from the target.

20. The scanning radiation sensor of claim 14 in which said marking line viewability enhancing means includes
   a camera with a screen for display of the marking line, and
   means for mounting the light filter to the camera to attenuate light to the camera.

21. The scanning radiation sensor of claim 20 in which said camera has a substantially uniform response for a substantial portion of visible light having a wavelength less than the minimum wavelength of the light source.

22. The scanning radiation sensor of claim 14 in which
said scanning temperature sensing element assembly includes
a sensing element, and
a rotating scanning reflective member off which light from the target is directed to the sensing element, and
said light beam directing means includes means for directing light to the target by reflecting it off the scanning reflective member.

23. The scanning radiation sensor of claim 14 in which said viewability enhancing means includes
a television camera with an automatic gain control and a display screen, and
means for mounting the light filter to the camera to cause the automatic gain control to relatively brighten light from the light source reflected from the target to the camera.

24. The scanning radiation sensor of claim 14 in which said sensing element is responsive to infrared light radiation.

25. The scanning radiation sensor of claim 14 in which said sensing element is responsive to infrared light radiation.

26. In a scanning radiation sensor having a scanning sensing element assembly for detecting radiation along a line segment, the improvement being a sighting apparatus for locating the line segment on a target to be sensed, comprising:
a solid state source of laser light in the visible spectrum; and
means for scanning the laser light along a marking line segment on the target which coincides with the line segment along which temperatures will be sensed.

27. The scanning radiation sensor of claim 26 including means for operating the source of laser light intermittently to produce marking spots along the marking line.

28. The scanning radiation sensor of claim 27 including
means for determining the radiation of selected spot targets along said marking line, and
means for controlling said on and off timing means to cause said marking spots to substantially coincide with the selected spot targets.

29. The scanning radiation sensor of claim 26 in which
said scanning sensing element assembly includes a sensing element and a rotating reflective member off which light from the target is redirected to the sensing element, and
said laser light scanning means includes means for directing light for the source of laser light to reflect off said reflective member to form said marking line segment.

30. The scanning radiation sensor of claim 26 in which the sighting apparatus includes
a viewing apparatus with a light filter for attenuating light at wavelengths substantially different from that of the light source to enhance viewability of the marking line.

31. The scanning radiation sensor of claim 30 in which
said sensor has a continuous mode in which the radiation along said entire line segment is measured, and
said source of laser light includes
a laser, and
means for operating the laser continuously to produce a marking line which is substantially continuous when said sensor is in said continuous mode.

32. The scanning radiation sensor of claim 31 in which
said sensor has a spot mode in which the temperatures only at preselected spot targets along said line segment are measured, and
said source of laser light includes
a laser, and
means for operating the laser intermittently to produce marking spots of laser light which substantially coincide with spot targets along said line segments to be measured.

33. The scanning radiation sensor of claim 26 in which
said sensor has a spot mode in which the radiation only at preselected spot targets along said line segment are measured, and
said source of laser light includes
a laser, and
means for operating the laser intermittently to produce marking spots of laser light which substantially coincide with spot targets along said line segments to be measured.

34. The scanning radiation sensor of claim 26 in which said sensing element assembly includes a sensing element responsive to infrared radiation.

35. In a scanning radiation sensor having a scanning sensing element assembly for detecting the radiation of selected spot targets located along a scanning line on a target, a method of locating the spot targets, comprising the steps of:
(a) directing a beam of light produced from a source of light in the visible spectrum at the target; and
(b) controlling the beam of light to produce directly observable light marking spots on said target coinciding with the selected spot targets along said scanning line to be sensed.

36. The scanning radiation sensor of claim 35 in which said source of light includes a laser.

37. The scanning radiation sensor of claim 35 in which
said source of light includes a laser, and
said step of controlling includes the steps of
scanning the light, and
intermittently operating the light while the light is scanned to produce said marking spots.

38. The method of claim 37 in which said laser is a solid state laser.

39. The method of claim 35 in which
said scanning sensing element assembly includes a sensing element and a rotating reflecting member off which light from the target is directed to the sensing element, and
said step of controlling includes the step of directing light from the source of light to reflect off said mirror to form said marking line segment.

40. The method of claim 35 in which said sensor has a substantially continuous mode in which the temperatures along a line segment are measured, and said step of controlling includes the step of operating the source of light continuously to produce a projected substantially continuous marking line when said sensor is in said continuous mode.

41. The method of claim 35 including the step of viewing the light marking spots on the target with a light filter for attenuating light at wavelengths substantially different from that of the light of the light source to enhance viewability of the marking line.

42. The method of claim 35 in which all of said scan path lies in a scanning plane and said light marking spots are aligned in said scanning plane.

43. The method of claim 35 in which the scanning sensing element assembly includes a sensing element responsive to infrared radiation.

* * * * *